US012056947B2

(12) United States Patent
Berger et al.

(10) Patent No.: US 12,056,947 B2
(45) Date of Patent: Aug. 6, 2024

(54) AGREEMENT DOCUMENT MODEL MODIFICATIONS IN A DOCUMENT MANAGEMENT SYSTEM

(71) Applicant: DocuSign, Inc., San Francisco, CA (US)

(72) Inventors: Alexander B. Berger, Sammamish, WA (US); Jerome Simeon, New York, NY (US); Peter Geoffrey Lerato Hunn, Dallas, TX (US); Daniel Charles Selman, Winchester (GB); Richard Tkachuk, Bellevue, WA (US); Matthew Roberts, South Moreton (GB)

(73) Assignee: DOCUSIGN, INC., San Francisco, CA (US)

( * ) Notice: Subject to any disclaimer, the term of this patent is extended or adjusted under 35 U.S.C. 154(b) by 16 days.

(21) Appl. No.: 17/683,155

(22) Filed: Feb. 28, 2022

(65) Prior Publication Data

US 2023/0298368 A1    Sep. 21, 2023

(51) Int. Cl.
*G06V 30/41* (2022.01)
*G06F 16/30* (2019.01)
*G06N 3/08* (2023.01)

(52) U.S. Cl.
CPC ............ *G06V 30/41* (2022.01); *G06F 16/30* (2019.01); *G06N 3/08* (2013.01)

(58) Field of Classification Search
CPC ........... G06V 30/41; G06F 16/30; G06N 3/08
USPC ........................................................ 715/234
See application file for complete search history.

(56) References Cited

U.S. PATENT DOCUMENTS

| | | | |
|---|---|---|---|
| 6,606,620 B1 * | 8/2003 | Sundaresan | G06F 16/30 |
| 8,788,523 B2 * | 7/2014 | Martin | G06Q 50/18 |
| | | | 707/804 |
| 9,898,528 B2 | 2/2018 | Kesin | |
| 10,216,713 B2 | 2/2019 | Hargarten et al. | |
| 11,593,685 B1 | 2/2023 | Chan et al. | |

(Continued)

FOREIGN PATENT DOCUMENTS

| EP | 1447754 A1 | 8/2004 |
|---|---|---|
| WO | 2011002777 A2 | 1/2011 |

OTHER PUBLICATIONS

U.S. Appl. No. 17/683,139, filed Feb. 28, 2022, naming inventors Berger et al.

(Continued)

*Primary Examiner* — Shahid K Khan
*Assistant Examiner* — Ahamed I Nazar
(74) *Attorney, Agent, or Firm* — Shumaker & Sieffert, P.A.

(57) ABSTRACT

A document management system utilizes document models for querying, validating, and customizing electronic agreement documents. Document models can be a data structure including document attributes that represent an agreement document. Examples of document attributes include customizable data values, conditions related to the operation of the agreement document and satisfiable by certain values of the customized data values, and rendering parameters for the appearance of the electronic agreement document. The document management system enables a user to create custom document models for generating electronic agreement documents that can be queried, validated, and customized through querying, validating, and customizing the corresponding document models.

20 Claims, 9 Drawing Sheets

(56) References Cited

U.S. PATENT DOCUMENTS

| | | |
|---|---|---|
| 11,710,334 B2 | 7/2023 | Middendorf et al. |
| 2007/0050713 A1 | 3/2007 | Yoshioka et al. |
| 2007/0118486 A1 | 5/2007 | Burchetta et al. |
| 2008/0100874 A1 | 5/2008 | Mayer |
| 2010/0318369 A1* | 12/2010 | Nambiar ............ G06Q 30/0635 |
| | | 705/1.1 |
| 2011/0161092 A1 | 6/2011 | Sudhi |
| 2011/0251963 A1 | 10/2011 | Rosenhan |
| 2013/0019167 A1 | 1/2013 | Whetsell et al. |
| 2015/0229667 A1 | 8/2015 | Ramarao |
| 2016/0155135 A1 | 6/2016 | Papa et al. |
| 2016/0224526 A1* | 8/2016 | Gazit .................... G06F 40/117 |
| 2018/0060122 A1 | 3/2018 | Tang et al. |
| 2020/0143301 A1 | 5/2020 | Bowers |
| 2021/0049320 A1* | 2/2021 | Shimkus ................ G06Q 40/12 |
| 2021/0201013 A1* | 7/2021 | Makhija ............... G06V 30/414 |
| 2023/0126497 A1 | 4/2023 | Tkachuk et al. |
| 2023/0245254 A1 | 8/2023 | Ramoutar et al. |

OTHER PUBLICATIONS

U.S. Appl. No. 17/683,143, filed Feb. 28, 2022, naming inventors Berger et al.

Nayak et al., "Automatic detection and analysis of DPP entities in legal contract documents", 2019 First International Conference on Digital Data Processing (DDP), IEEE, Nov. 15, 2019, pp. 70-75.

Owczarek et al., "Electronic document management system", Proceedings of the International Conference Mixed Design of Integrated Circuits and System, Jun. 22, 2006, pp. 791-792.

\* cited by examiner

700

702
Access a document model including a set of document objects, the document model corresponding to an agreement type, the set of document objects each corresponding to a characteristic of an agreement document

704
Modify an agreement document of a set of agreement documents using the document model, the modified agreement document including one or more of the set of document objects including a value representative of the characteristic of the agreement document

706
Receive a query identifying an agreement document characteristic and an agreement document condition

708
Query the set of document objects to identify documents in a set of modified agreement documents including the modified agreement document, the set of modified agreement documents including document objects corresponding to the agreement document characteristic and including values that satisfy the agreement document condition

710
Provide the identified documents to a client device for display in conjunction with the agreement document characteristic and the agreement document condition

FIG. 7

AGREEMENT DOCUMENT MODEL MODIFICATIONS IN A DOCUMENT MANAGEMENT SYSTEM

TECHNICAL FIELD

The disclosure generally relates to generating electronic agreement documents, and more particularly to document models for querying, validating, and customizing electronic agreement documents.

BACKGROUND

While electronic agreement documents have improved the convenience and accessibility for negotiating and managing agreements, electronic agreement documents have also created technological challenges. When content of agreement documents are stored as unstructured data, intensive processing resources are expended to find a document or documents that share a common attribute. For example, to find a particular document in a database of documents, the entirety of text of each document in the database can be queried for a matching keyword or regular expression. This is time consuming and processing intensive.

Unstructured data also creates challenges for validating information in an electronic agreement document, as validating data first requires identification of the data to be validated. There is an extra operation of identifying the data from an unstructured format before the data can be validated. Furthermore, once an electronic agreement document is created, editing the unstructured data can be challenging and time consuming, as processing resources are first dedicated to identifying what information a user wants to edit before editing the agreement document. For example, a user wanting to change the dates during which a contract is effective can either manually identify the dates in the document to edit or can use regular expressions or keyword searches to assist with identifying where the dates in an agreement are before editing them.

Additionally, electronic agreement documents occupy memory space, where much of the storage can be unnecessarily allocated for content that is the same across the documents. For example, an employment contract may have standard language regarding anti-discrimination practices that is included and stored for each employee's contract. With this redundant replication of standard language, memory resources are unnecessarily wasted when storing electronic agreement documents.

SUMMARY

Systems and methods are disclosed herein for a document management system that utilizes document models for querying, validating, and customizing electronic agreement documents. Document models can be a data structure including document attributes that represent an agreement document. Examples of document attributes include customizable data values, conditions related to the operation of the agreement document and satisfiable by certain values of the customized data values, and rendering parameters for the appearance of the electronic agreement document. The document management system enables a user to create custom document models for generating electronic agreement documents that can be queried, validated, and customized through querying, validating, and customizing the corresponding document models.

For example, to find a particular document in a database of documents, the document management system may search a data model rather than the entirety of text of each document in the database. Thus, reducing process resources consumed and decreasing the time needed to query for documents. The structured data of a document model addresses challenges for validating information in an electronic agreement document by not requiring an initial identification of values to be validated from unstructured data. Instead, the document management system may directly access values stored in document models for validation. Furthermore, the document management system may directly edit the structured data in a document model (e.g., changing the value of a document object in a model) to edit the agreement document. For example, a user wanting to change the dates during which a contract is effective can edit the corresponding document objects for the dates in the agreement's document model and create an updated agreement from the modified document model. Additionally, the document models may occupy less memory than their counterpart electronic agreement documents. In one example, a shared template with standard language can be stored along with various document models that, when combined with the shared template, may generate custom agreements for different individuals to execute. The document management system may optionally store the agreement documents or create the documents as users request them. Thus, the document management system conserves memory resources that may otherwise be unnecessarily wasted when storing electronic agreement documents.

The document management system can modify agreement documents using document models that each include a set of document objects corresponding to characteristics of the documents. The document objects can be customized by users, or can be standard for an agreement document type. The document management system allows a user to search for an agreement document via a query for a document object or a condition that can be satisfied by values of the document objects. The results that satisfy the search criteria can be returned without searching the contents of the agreement documents themselves. The document models may be a structured data format for representing the agreement documents, reducing the processing resources needed to find an agreement document amidst unstructured data.

In one embodiment, the document management system accesses a document model that corresponds to a particular agreement type (e.g., non-disclosure agreement). The document model can include document objects that correspond to a characteristic of an agreement document. The document management system modifies an agreement document using the document model, where the modified agreement document includes the document model's document objects and their corresponding values representative agreement characteristics. The document management system can receive a query from a user's client device, where the query identifies query parameters like an agreement document characteristic and/or an agreement document condition. The document management system queries document models' document objects to identify documents in a set of modified agreement documents that include document objects corresponding to a queried agreement document characteristic or documents whose values satisfy a queried agreement document condition. The document management system provides the identified documents to the user's client device for display with the query parameters (e.g., the queried agreement document characteristic or the queried agreement document condition).

The document management system can store documents returned from a user's query at a storage and after providing the documents to the user, deletes the stored documents. The document management system can delete the documents after determining that the user has accessed the documents at a client device or after a period of time has expired since providing the queried documents.

An object requirement of the document model can include a condition that must be satisfied by one or more of the document model's document values before an agreement document can be executed. The document management system can validate an agreement document (e.g., an agreement document modified by a document model) by determining that the condition of the object requirement is satisfied. The document management system may determine whether a condition is satisfied by providing a document object's values to a third-party service to determine whether the value is proper. Additionally or alternatively, the document management system may determine whether a condition is satisfied by comparing a document object's values to corresponding values of another document (e.g., determining if a user's name matches the user's name as listed in other document models). The document management system may determine that the condition is satisfied in response to determining that corresponding values between the two or more document models match.

The document management system can generate a document model from an agreement document. The document management system can receive a document that includes values of objects, where the values are represented as text strings and decoupled from a given document object (e.g., the values are not assigned to document objects or organized in a document model when the document is received). The document management system identifies the document as corresponding to one or more agreement documents generated using corresponding document models. The document management system uses the agreement documents and their corresponding document models to identify the values in the received document and create a document model using the identified values. The document management system can store the received document in storage and delete the received document after creating the document model.

The document management system can receive a null result from a query of documents based on a user's query parameters (e.g., determining that no document matches the user's query). The document management system can then determine an alternative query parameter that would return a document. The document management system can determine an alternative agreement characteristic included within agreement documents generated using document models or an alternative agreement document condition satisfied by values included within the agreement documents. The document management system can provide the alternative query parameter to the user (e.g., at the user's client device) for selection and subsequent querying. The document management system can receive a user's selection of an alternative query parameter, identify which documents satisfy the alternative query parameter, and provide those identified documents to the client device for display. The alternative query parameter may also be displayed in conjunction with the identified documents.

The document management system can define document models and generate, using the document models, agreement documents associated with a signing entity. Values in the document models can be used to determine whether the agreement document can be executed by the signing entity. For instance, the document model can include a set of object requirements that must be satisfied before the agreement document can be executed. If the set of object requirements of the agreement document model are not satisfied, the document management system can deny a request to execute the agreement document and present the object requirements that are not satisfied to a user to enable the user to remedy the unsatisfied requirements.

In another embodiment, the document management system can access a document model corresponding to a particular agreement type. The document model can include document objects and object requirements, where the document objects each correspond to a characteristic of an agreement document and where the object requirements each include a condition that must be satisfied by a document object before the agreement document can be executed. The document management system may generate the agreement document based on the document model. The agreement document can be associated with one or more signing entities and include values for the document objects. In response to receiving a request to electronically sign the agreement document from one of the signing entities, the document management system can determine whether the values of the document objects satisfy the document model's object requirements and if the requirements are satisfied, the document management system can provide the agreement document to the signing entity for execution. If the requirements are not satisfied, the document management system can deny the electronic signature request and identify to the signing entity which of the object requirements were not satisfied.

The document management system can determine that the signing entity has provided their electronic signature and subsequently modify the document model to include the electronic signature (e.g., an image of the signature). The document management system can store the agreement document in storage and after modifying the document model to include the electronic signature, the document management system can delete the agreement document from the storage. The document management system can create agreement documents using templates and document models. The document management system may access a template associated with a particular agreement type, where the template includes variables from respective document objects. The document management system can assign the values of document objects to the corresponding variables of the template.

The document management system can enable a user to define a custom document model. The document management system can identify historical document models that correspond to a same agreement type as the agreement document models defined by the users. In response, the document management system can identify document model objects included in the historical document models that are not included in document models defined by the user, and can prompt the user to add the identified objects in the historical document models to the custom document model.

In yet another embodiment, the document management system receives a definition of a target document model corresponding to a particular agreement type. The definition may be received from a user. The target document model may include target document objects that correspond to a characteristic of an agreement document. The document management system may access a set of historical agreement documents corresponding to the particular agreement document type. Each historical agreement document can be associated with a corresponding historical document model. The document management system can identify document objects within the historical document models and that are not included in the target document model. The document management system can present the identified document objects to the user. The document management system can determine whether a user has selected one of the presented document objects and if the user has selected one, may modify the target document model to include the selected document object (e.g., include the selected document object in the target document model).

The document management system may identify a document object that is included in a historical document model and not included within a target document model by using a statistical model of document objects. The document management system can access a statistical model of document objects included within the historical document models and filter, using the statistical model, a subset of the document objects that are missing from the target document model from historical document models' document objects. The document management system can generate the statistical model by determining a correlation between document objects included within the historical document models and the type of agreement document. The statistical model include a histogram of document objects included within the historical document models. The document management system can filter the subset of document objects that are missing from the target document model by determining histogram bins that meet a threshold object count.

The document management system can determine object requirements that are missing from the target document model and present in the historical document models. The document management system may apply a machine-learned model to the set of target document objects and determine a utility score representative of a similarity between the target document objects and target object requirements and those of historical document models. The document management system may determine that the score does not meet a threshold score and in response, determine a object requirement of the historical document models that is not included within the object requirements of the target document model. The machine-learned model can be trained by the document management system using historical document models and their historical object requirements.

The document management system can additionally or alternatively identify a document object that are included in the target document model but that is not included in the historical document models. The document management system can present the identified document object to the user and through a user interface presented at the user's client device, enable the user to request that the target document model be modified to exclude the identified document object. The document management system may modify a target document model based on a location of a signing entity. The document management system receives a request from a signing entity to electronically sign the agreement document. The document management system determines a location of the signing entity and modifies the target document model based on the location. The document management system generates the agreement document based on the modified target document model.

The document management system can filter the set of historical agreement documents from a database of historical agreement documents, narrowing the amount of historical agreement documents used for comparison against the target model and reducing the processing resources that may otherwise be needed for a comparison against the totality of historical agreement models. The document management system filters the set of historical agreement documents by identifying a characteristic of an organization to which the user belongs, determining organizations that have the characteristic, and identifying historical agreement documents generated by those organizations and share the same agreement type as the target document model.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 7 is a flowchart illustrating a process for fulfilling a user's query to provide an agreement document using a document mode, in accordance with one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Document Management System Environment

Figure 1:
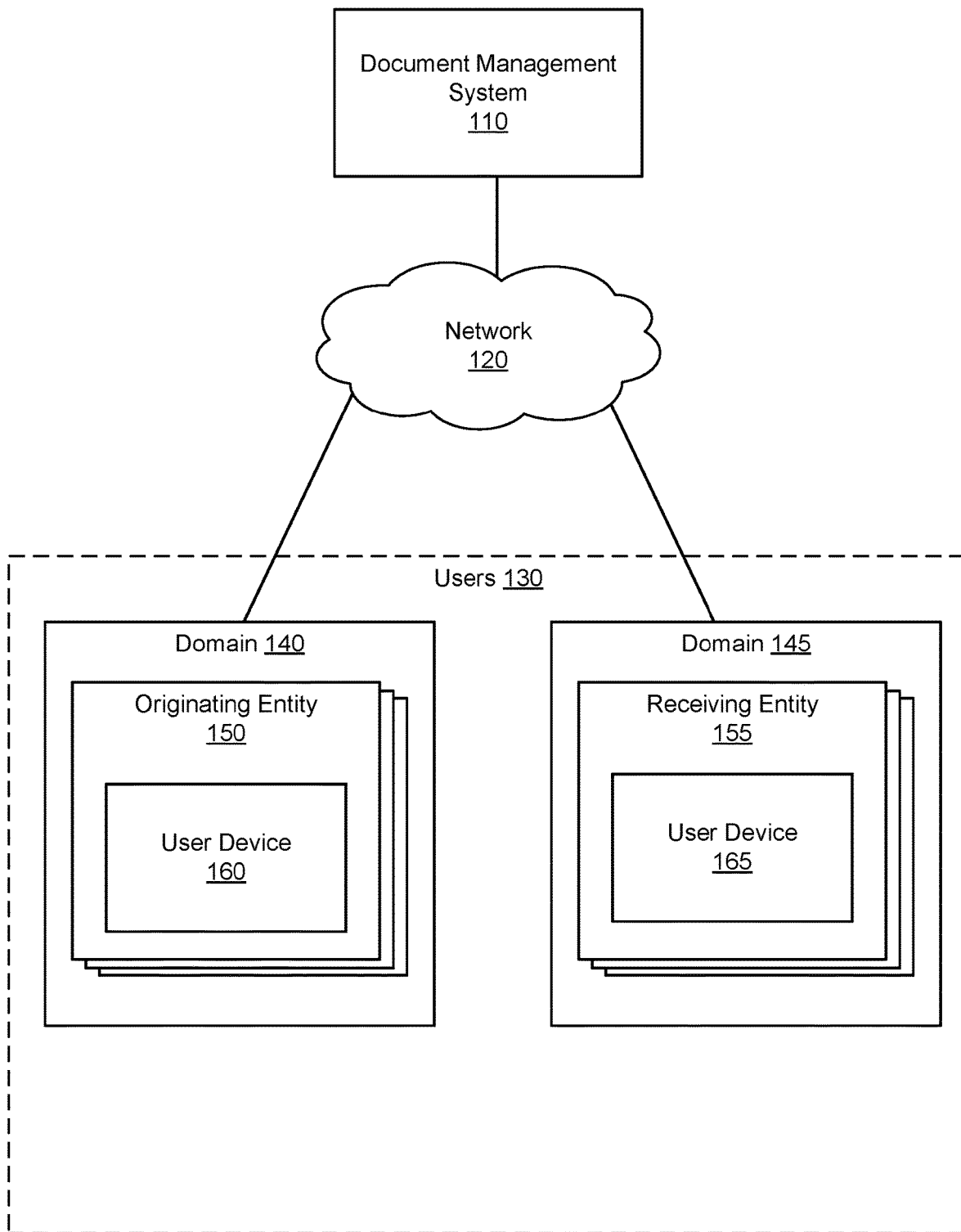
FIG. 1 is a block diagram of a system environment in which a document management system operates, in accordance with one embodiment.

FIG. 1 is a block diagram of a system environment 100 in which a document management system 110 operates, in accordance with one embodiment. System environment 100 includes the document management system 110, a network 120, users 130 which includes a subset of originating entities 150 associated with a domain 140 and a subset of receiving entities 155 associated with a domain 145. Each of originating entities 150 and receiving entities 155 can be associated with respective user devices (e.g., a user device 160 or a user device 165). In alternative configurations, different and/or additional components may be included in the system environment 100. The document management system may be a centralized or a de-centralized management system. For example, the operations can be performed at least in part by software applications of a de-centralized system installed on individual user devices.

The document management system 110 is a computer system (or group of computer systems) for storing and managing documents and/or envelopes for users 130. Using document management system 110, the users 130 can collaborate to create, edit, review, negotiate, and execute documents. The document management system 110 allows the users 130 to generate and modify a collection of one or more agreement documents, which may also be referred to as a "document envelope" or "envelope." The envelope may include at least one agreement document for execution. The document management system 110 may provide the at least one agreement document (e.g., a contract, purchase order, non-disclosure agreement, terms of service agreement, or other suitable document) in which terms have been agreed upon by two or more domains (e.g., by two or more of the users 130 from the domain 140 and the domain 145) to the receiving entity 155 of the domain 145 for execution, as described above. The document management system 110 may generate an envelope per a request from the originating entity 150 of the domain 140. In some embodiments, the document management system 110 enforces a set of document permissions for accessing or modifying the envelope.

The document management system 110 enables the creation, querying, validation, and customized modification of envelopes using document models. The document models may be a dynamic data structure that is created and modified to generate an agreement document. For example, the document model includes the data, signature fields, and rendering information (e.g., font style, paragraph spacing, etc.) to create an agreement document that can be electronically signed. Some advantages of the document models for creating the agreement document are the querying, validation, and customized modification (e.g., making recommendations for modifying an agreement document) that consumes less processing resources than the same operations without a document model. In particular, the document model enables the representation of an agreement document as structured data that can be queried using less processing resources than needed for finding data in an unstructured data format. The structured data format also in turn enables validation mechanisms that are less processing intensive than agreements having unstructured data, as validating data is often preceded by finding the data to be validated. For example, the document management system 110 can query a document model for the address of a company in an agreement document and verify that the address is proper by comparing it to addresses of the company listed in other document models.

After an agreement document is generated using the document model, the document management system 110 stores the document model that can be used for subsequent querying of the generated agreement document (e.g., from a database of agreement documents). The document management system 110 can also facilitate automated operations involving the agreements. For example, a user may request to be notified within sixty days of a contract's expiration, where the document management system 110 can query the contract's corresponding document model for the expiration date in the data structure and create an electronic reminder for sixty days after the expiration date.

The document management system 110 can be a server, server group or cluster (including remote servers), or another suitable computing device or system of devices. In some embodiments, the document management system 110 can communicate with the user devices 160 and 165 over the network 120 to receive instructions and send envelopes for access on the user devices 160 and 165. As referred to herein, the terms "user device" and "client device" are interchangeable unless otherwise specified or apparent from the context in which the terms are used. The document system 110 may also communicate with the user devices 160 and 165 over the network 120 to receive instructions for creating or modifying document models. The document management system 110 is discussed in further detail with respect to FIG. 2.

The network 120 transmits data within the system environment 100. The network 120 may comprise any combination of local area and/or wide area networks, using both wired and/or wireless communication systems, such as the Internet. In some embodiments, the network 120 transmits data over a single connection (e.g., a data component of a cellular signal, or Wi-Fi, among others), and/or over multiple connections. In some embodiments, the network 120 uses standard communications technologies and/or protocols. For example, the network 120 includes communication links using technologies such as Ethernet, IEEE 802.11, 4G, 5G, code division multiple access (CDMA), digital subscriber line (DSL), and the like. Data exchanged over network 120 may be represented using any suitable format, such as hypertext markup language (HTML) or extensible markup language (XML). In some embodiments, the network 120 may include encryption capabilities to ensure the security of customer data. For example, encryption technologies may include secure sockets layers (SSL), transport layer security (TLS), virtual private networks (VPNs), and Internet Protocol security (IPsec), among others.

Through the network 120, the document management system 110 can communicate with the user devices 160 and 165 associated with the users 130. A user can represent an individual, group, or other entity that is able to interact with envelopes generated and/or managed by the document management system 110. Each user can be associated with a username, email address, or other identifier that can be used by the document management system 110 to identify the user and to control the ability of the user to view, modify, and otherwise interact with envelopes managed by the document management system 110. In some embodiments, the users 130 can interact with the document management system 110 through a user account with the document management system 110 and the one or more user devices 160 and 165 accessible to the users 130.

As described above, a domain (e.g., the domains 140 and 145) is a business, group, individual, or the like that is associated with a set of users and one or more envelopes in the document management system 110. For example, an envelope may originate at the domain 140 and be sent to the domain 145 for viewing, editing, and execution. In one embodiment, the envelope may be created by the originating entity 150 and be sent via the document management system 110 to the receiving entity 155 during the execution of the one or more documents included within the envelope.

In the embodiment of FIG. 1, the originating entity 150 from the domain 140 can create an envelope via the document management system 110. In this example, the domain 140 includes a set of originating entities 150 which, as used herein, are a subset of the users 130 who have user accounts with the document management system 110. The domain 145 includes a set of receiving entities 155 which, as used herein, are a subset of the users 130 who have user accounts with the document management system 110. The envelope is sent by the document management system 110 for review and execution by a receiving entity of the domain 145.

A user device (e.g., the user devices 160 and 165) is a computing device capable of receiving user input as well as transmitting and/or receiving data to the document management system 110 via the network 120. For example, a user device can be a desktop or a laptop computer, a smartphone, tablet, or another suitable device. Each user device may have a screen for displaying content (e.g., videos, images, content items, or online documents to be executed) or receiving user input (e.g., a touchscreen). User devices are configured to communicate via the network 120. In one embodiment, a user device executes an application allowing a user of the user device to interact with the document management system 110. For example, a user device can execute a browser application to enable interaction between the user device and the document management system 110 via the network 120. In some embodiments, a single user can be associated with multiple user devices, and/or one user device can be shared between multiple users who may, for example, log into a personal account on the user device to access the document management system 110.

Document Management System

Figure 2:
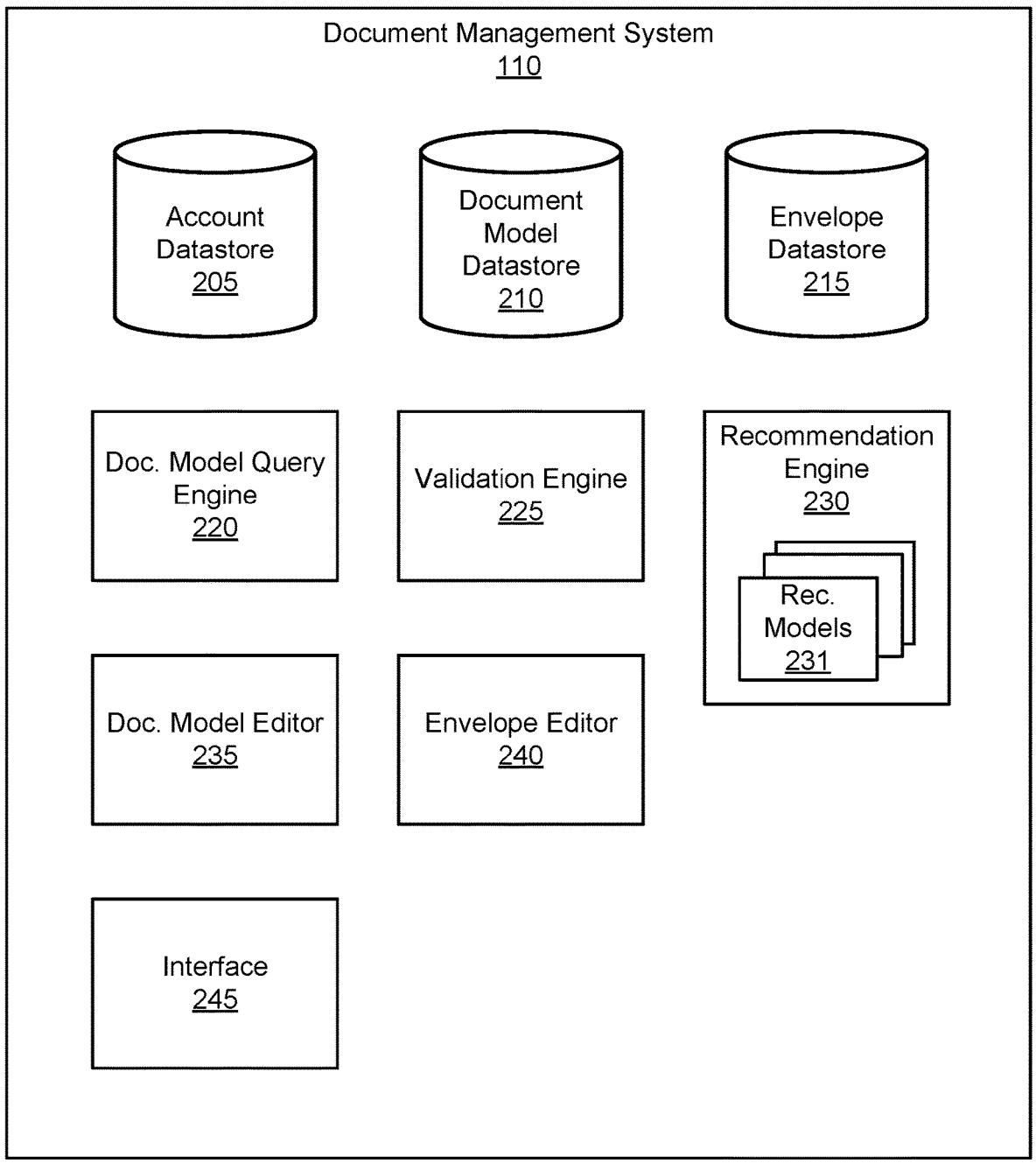
FIG. 2 is a block diagram of the document management system of FIG. 1, in accordance with one embodiment.

FIG. 2 is a block diagram of a document management system 110 of FIG. 1, in accordance with one embodiment. The document management system 110 includes or accesses local databases such as an account datastore 205, a document model datastore 210, and an envelope datastore 215. Document management system 110 includes software modules such as a document model query engine 220, a validation engine 225, a recommendation engine 230, a document model editor, and an envelope editor. Document management system 110 includes one or more statistical or machine-learned models 231. The document management system 110 includes an interface 245, which may include hardware and/or software components, that enable the document management system 110 to communicate with user devices or third-party platform servers through the network 120. The document management system 110 may have alternative configurations than shown in FIG. 2, including different, fewer, or additional components.

The account datastore 205 is a file storage system, database, set of databases, or other data storage system storing information associated with accounts of the document management system 110. The domains 140 and 145 may be associated with one or more accounts with the document management system 110. In some embodiments, a domain may be associated with a parent account and each entity within the domain may be associated with a user account. For example, the domain 145 has a parent account and each receiving entity 155 within the domain 145 has a user account with the document management system 110. The parent account may be associated with a policy of the domain 145 and/or an org chart for the domain 145. A policy of the domain 145 is a system of principles that guide certain processes or workflows for the domain 145. For example, a policy of the domain 145 may dictate which receiving entities 155 within the domain 145 are to receive envelopes and a set of tasks the receiving entities 155 are to perform in relation to the envelopes.

Each user account associated with an entity may include information about the entity, such as information about the individual with access to the user account, age of the account, frequency of account use, log of past account transactions, and the like. Information about the individual with access to the account may include the individual's name, email address, title, role, department, and the like. The individual's title is a position title or job title held by the individual with the domains 140 and 145. The individual's role is a function that the individual fulfills within their domain. For example, a title may be "General Counsel" and a role may be reviewing and executing agreements. The individual's department is a group within the domain where the individual works. For example, a department may be operations, finance, sales, human resources, purchases, legal, and the like.

The document model datastore 210 is a file storage system, database, set of databases, or other data storage system storing document models and/or information associated with document models. A document model can include document objects and object requirements. A document object may be a variable field that can contain a value specific to a particular agreement. For example, a document object may be a variable field that can contain a name of a hospital patient. In another example, a document object may be an electronic signature field where a signing entity may apply their electronic signature to an agreement document. An object requirement may be a collection of one or more agreement document conditions. The object requirements may be verified before allowing a user to execute an agreement document. An agreement document condition may be a rule that requires a document object having a certain value before an action can be performed (e.g., accessing a document, executing a document, etc.). An agreement document may be characterized by an agreement document characteristic, which can be a construct of an agreement (e.g., consideration is a characteristic of a contract) that can be represented by one or more document objects or any suitable descriptive parameter of an agreement document. In some embodiments, an agreement document characteristic may be a particular combination of a document object and its value. The agreement document characteristic may be a particular combination of an object requirement and a condition that must be satisfied by one or more values of document objects.

In some embodiments, an agreement document is characterized by document attributes included in a document model. Document attributes can include document objects for structuring or organizing the data contained in an agreement document (e.g., name of parties involved, dates during which the agreement is effective, etc.), object requirements (e.g., conditions to be satisfied by values of the document objects), rendering parameters (e.g., definitions of form and format in which the agreement document is presented), or metadata of the agreement document (e.g., agreement type, recipients of electronic copies of the agreement document, when the agreement was created, users who have edited the agreement document, etc.). In some embodiments, a document model can correspond to an agreement type. For example, metadata of the document model specifies the agreement type. The agreement type can be user-specified or determined automatically (e.g., using a machine-learned model trained to classify a document model according to an agreement type based on document attributes of the document model).

The envelope datastore 215 is a file storage system, database, set of databases, or other data storage system storing envelopes and/or information associated with envelopes. The domains 140 and 145 provide one or more documents for execution to other domains via envelopes. A document envelope can include at least one document for execution. The at least one document may have been previously negotiated by the domains 140 and 145. And, as such, the document may be ready for execution upon the creation of an envelope. The envelope may also include recipient information and document fields indicating which fields of the document need to be completed for execution (e.g., where a receiving entity 155 should sign, date, or initial the document). The recipient information may include contact information for a receiving entity 155 (e.g., a name and email address). Envelopes can include templates of envelopes that may be modified by the envelope editor 240 to generate a specific version of an envelope for execution, which can also be stored in the envelope datastore 215. For example, a template for a non-disclosure agreement can be stored in the envelope datastore 215 with modifiable fields for a user's name and dates during which the agreement is effective. The templates may each include locations that a user may place a given document object. The template may also include locations for standard language of an agreement (e.g., boilerplate text that is the same across multiple agreement documents). The locations of the standard language and placement of document objects may be user-specified, received by the envelope editor 240 to modify or create a template.

The document model query engine 220 allows a user to search for an agreement document using a document model or document object. The document model query engine 220 may also allow the user to search for a document model or document object. Using a document model to query the contents of agreement documents reduces the use of processing resources, which in turn decreases the time for the query result to return. This improvement may be over a conventional search through all text of agreement documents whose data that is not organized into document models, which can be processing intensive (e.g., first using optical character recognition (OCR) before being able to search through text strings for the desired data value).

The document model query engine 220 can receive a query identifying an agreement document characteristic, an agreement document condition, or a combination thereof. The query can be provided to the document management system 110 by a user via a user device over the network 120. The query may be provided through a graphical user interface (GUI) generated by the document management system 110. The GUI may be provided for display at a screen of the user device and include user input elements such as text fields or dropdown menus for the user to select an agreement document characteristic or an agreement document condition to use in a query. The document model query engine 220 queries document objects to identify agreement documents that include the agreement document characteristic or a value satisfying the agreement document condition.

The document model query engine 220 may identify agreement documents that include a particular agreement document characteristic by querying the document model datastore 210 for one or more of the document object or the object's value as specified by the user provided agreement document characteristic. For example, the document model query engine 220 queries, from the datastore 210, a document object corresponding to a specific agreement end date. The document model query engine 220 may identify agreement documents that include a value satisfying an agreement document condition by querying the document model datastore 210 for document models that include a document object and a corresponding value that satisfy the condition. For example, the document model query engine 220 queries the datastore 210 for document objects corresponding to a company's name and address and the corresponding values if an object requirement specifies a condition that a company's address must be present if the company's name is present. After querying for the document models stored in the datastore 210 that include the document object or the object's value, the document model query engine 220 may access the envelopes or agreement documents from the envelope datastore 215 that are generated using the queried document models.

The document model query engine 220 may then provide the accessed envelopes or agreement documents to a client device from which the query was received. The document model query engine 220 may provide the envelopes or agreement documents for display in conjunction with the parameters of the query (e.g., the agreement document characteristic, agreement document condition, or combination thereof). In some embodiments of providing the document for display in conjunction with query parameters, the document model query engine 220 causes portions of an agreement document that are directly related to the query parameters to be visually distinguished from other portions that are not directly related to the query parameters. For example, the document model query engine 220 may highlight the start and end dates of an agreement when the query included an agreement characteristic of a particular range of dates, where the user is looking for agreements that start and end within that particular range of dates. In some embodiments of providing the document for display in conjunction with query parameters, the document model query engine 220 may directly display the query parameters alongside the document agreement (e.g., listing an agreement document characteristic or an agreement document condition in a panel adjacent to the document).

In some embodiments, the document model query engine 220 can determine that there is no agreement document or envelope that matches the user's query (e.g., does not contain the agreement document characteristic or satisfy an agreement document condition that the user specified in their query). The document model query engine 220 may then determine an alternative agreement document characteristic that is indeed included in an agreement document or an alternative agreement document condition that an agreement document does indeed include. For example, if a user's query for agreement documents effective from February to December of one year does not return a matching agreement document, the document model query engine 220 may modify the query parameters to identify a matching agreement document. These modified query parameters may be the alternative agreement document characteristic or the alternative agreement document condition. For example, the document model query engine 220 may modify the user's document agreement characteristic parameter to search for agreement documents effective from January to December, rather than limit the query to February to December.

The document model query engine 220 may use historical queries to determine the alternative document agreement characteristic or the alternative agreement condition. For example, the document model query engine 220 may determine a similarity between a historical query and the current query, and in response to determining that the similarity has exceeded a threshold, proceed to querying the document model datastore 210 with the query parameters of the historical query. The document model query engine 220 may, before performing an additional query using the modified query parameters, prompt the user to confirm whether they would like to proceed with the alternative query parameters. For example, following an earlier example involving the start and end dates of a contract, the document model query engine 220 may provide for display on the user's client device the alternative document agreement characteristic of contract start dates in January rather than February. The document model query engine 220 may then receive the user's selection or rejection of the alternative document agreement characteristic. In response to receiving the user's selection of the alternative document agreement characteristic, the document model query engine 220 may proceed to querying the document model datastore 210 for agreements documents having a start date in January and an end date in December. The document model query engine 220 may also provide the agreement documents matching the query for display at the user's client device. In this way, the document model query engine 220 may avoid unnecessary processing resource expense in the event that the user does not want to use an alternative query parameter.

The validation engine 225 validates values of a document model. The validation engine 225 may perform validation by determining whether the values satisfy one or more object requirements, determining the accuracy of the values, or a combination thereof. The validation engine 225 may validate a document model before a user can execute an agreement document generated from the document model. This may then minimize unnecessary usage of processing, network, and memory resources that would otherwise be spent on generating an invalid agreement document, transmitting and receiving the agreement document over a network (e.g., the network 120), and storing an invalid agreement document in memory (e.g., of the document management system 110 or a client device).

The validation engine 225 may receive a request from a client device (e.g., of a signing entity) to execute or electronically sign an agreement document. The request may be initially received by the interface 245, which can forward the request to the validation engine 225. Before providing the agreement document to the client device for execution, the validation engine 225 may determine whether the agreement document has been validated or not, and in response to determining that the document has not yet been validated, validate the document by validating the values of the document model used to generate the agreement document. To validate the values, the validation engine 225 may access object requirements of the document model. The validation engine 225 may determine whether one or more of the object requirements are satisfied by the values of the document model. For example, the validation engine 225 may determine that an emergency contact phone number is present for an emergency contact name in response to determining that an object requirement includes a condition that if an emergency contact is provided, a corresponding manner of contacting the emergency contact must be provided in the agreement document.

In response to the validation engine 225 determining that the values of the document model used to generate the agreement document do satisfy one or more object requirements of the document model, the validation engine 225 may retrieve the agreement document (e.g., from the envelope datastore 215) to provide to the client device of the signing entity for execution. Following the previous example, the validation engine 225 may determine that the document model includes values for the emergency contact name and contact phone number and thus, satisfies the object requirement needed for validating the agreement document. The validation engine 225 may then provide the agreement document with the completed emergency contact information to the signing entity for execution. In response to the validation engine 225 determining that the values of the document model used to generate the agreement document do not satisfy one or more object requirements of the document model, the validation engine 225 may deny the request to electronically sign the agreement document. The validation engine 225 may additionally or alternatively identify to the signing entity which of the object requirements aren't being satisfied by the values included in the document objects of the agreement model. For example, if the object requirement for validating the agreement model specifies that values for document objects corresponding to both contact name and contact phone number are required, the validation engine 225 may determine that the document model does not include one or more of the contact name of contact phone number values and deny the request to sign the agreement document. Additionally or alternatively, the validation engine 225 may identify to the signing entity that the values for the contact name and/or contact phone number are missing and preventing the agreement document from being validated for electronic signature. In one example of identifying the values to the signing entity, the validation engine 225 may provide a notification for display at the signing entity's client device with the missing values.

In one example of determining that a condition of an object requirement is satisfied, the validation engine 225 may provide a value of a document object to a third party service provider for validation. For example, the validation engine 225 may verify a user's identification information (e.g., social security number) by submitting a request to a government managed verification service. In another example, the validation engine 225 can verify a user's contact information (e.g., mailing address) provided as a document object value by providing a third party service provider with the document object values for the user's name and date of birth.

In another example of determining that a condition of an object requirement is satisfied, the validation engine 225 may compare a value of a document object needed to satisfy the condition with a value of another document model's corresponding document object. In response to the validation engine 225 determining that the values match, the validation engine 225 may determine that the condition is satisfied. For example, the validation engine 225 may compare a value of a user's date of birth in one document model to another document model having the user's date of birth to determine whether or not the values match. If the values match, the validation engine 225 may determine that the user's date of birth in both document models is validated. The validation engine 225 may find another document model for this comparison by instructing the document model query engine 220 to query the document model datastore 210 for document models having one or more document objects and values associated with the user (e.g., user's name or an identification number such as an employee ID). The document model query engine 220 may provide the queried document models to the validation engine 225, which then determines if the document object needed for validation has the same value across the queried document models.

In some embodiments, the validation engine 225 may validate an agreement document after the document model query engine 220 has received a user's query (e.g., for an agreement document having a particular agreement document characteristic or an agreement document condition) and before providing an agreement document satisfying the user's query. In this way, the validation engine 225 may further minimize occupying network bandwidth or storage space (e.g., on the user's device) for an agreement document that is invalid despite satisfying the user's query.

The recommendation engine 230 provides a recommendation to a user creating or editing a document model. The recommendation may be to add, modify, or remove an attribute related to document models. Such attributes may include a document object, an agreement document characteristic, an agreement document condition, object requirement, or any suitable attribute of the document model that a user can customize. The recommendation engine 230 may use one or more recommendation models 231 to determine a recommended attribute. The models 231 may include a statistical model, a machine learned model, or any suitable model for determining a recommendation having a threshold likelihood for the user to accept.

The recommendation engine 230 can receive a definition of a target document model corresponding to a type of agreement document. For example, the target document model is the "contract" type of agreement document. The definition may be specified by a user and received through the interface 245. The definition may be a set of document attributes (e.g., document objects, object requirements, rendering parameters, etc.) defining an agreement document that a user requests to create through a corresponding document model. The recommendation engine 230 can access a set of historical agreement documents corresponding to the type of agreement document. Each historical agreement document may correspond to a historical document model that includes the document objects, object requirements, and/or rendering parameters for generating the historical agreement document. The recommendation engine 230 may identify document objects within the historical models that are not specified by the definition of the target document model. Alternatively or additionally, the recommendation engine 230 may identify document objects that are not within the historical models but are specified by the definition of the target document model. The recommendation engine 230 may identify these differences in document objects and present them to the user within a recommendation to modify the target document model. The recommendation engine 230 may similarly identify differences in other document model attributes (e.g., identifying object requirements that were included in historical agreement documents but not specified by the definition of the target document model). Thus, while reference may be made to determining or filtering a particular type of document attribute (e.g., document objects) to make recommendations, the recommendation engine 230 may similarly determine or filter other document attributes.

The recommendation engine 230 may use a statistical model that represents a correlation between two document model attributes. The statistical model may belong to the recommendation models 231. The recommendation engine 230 may determine a conditional probability of one document attribute being present given the presence of another document attribute. For example, the recommendation engine 230 may determine, using historical document agreements, a condition probability of a document object for marital status being present given that the agreement document type is an employment contract. The recommendation engine 230 may use a statistical model to filter document objects from those in historical document models. The recommendation engine 230 can filter a portion from the entirety of historical document models or a category of historical documents (e.g., filter document objects from just agreements documents created within the last year). The document objects that are filtered from the historical document models may be objects that are not specified by a user-provided definition of a target document model. The recommendation engine 230 may generate the statistical models by calculating statistical relationships between document attributes. In some embodiments, the statistical model can include a histogram of the document objects included within historical document models, and the recommendation engine 230. The recommendation engine 230 may filter document objects using the histogram. For example, the recommendation engine 230 may create bins corresponding to the count of document objects within the historical document models, and determine a subset of the bins having a count meeting a threshold object count. The recommendation engine 230 may then evaluate the document objects of the subset of bins to determine which document object to recommend (e.g., the document object is one of the bins but not in the definition of the target document model).

The recommendation engine 230 may use a machine-learned model to identify document attributes to be included in a recommendation to modify a target document model. The machine-learned model may belong to the recommendation models 231. In one example where machine learning is used for recommendations related to object requirements, the machine-learned model may be configured to determine at least one object requirement that is satisfied by one or more of a set of target document objects in a target document model. The recommendation engine 230 may train the machine-learned model using historical agreement documents and corresponding historical document models. The recommendation engine 230 can re-train the machine-learned model using user feedback. For example, a user may provide feedback rejecting the incorporation of a recommendation determined by the recommendation engine 230, and the recommendation engine 230 may modify the training data or parameters (e.g., weights) of the machine-learned model to reduce the likelihood that the same recommendation is made again. In some embodiments, the recommendation engine 230 generates feature vectors whose features correspond to document attributes or any suitable parameter related to the content of the document model or operations involving an agreement document generated from the document model. Examples of features that the recommendation engine 230 may use to populate a feature vector include a historical document model's document objects (e.g., name, gender, date of birth, mailing address, and emergency contact), agreement type, user identifier of editor(s) of the historical document model, date the historical document model was created, date the historical document model was last edited, or a location of signing entity. In some embodiments, the dimensions of a feature vector can be independent of one another.

In one example of a feature vector, the entries of a feature vector are populated by the recommendation engine 230 with an agreement type of non-disclosure agreement (NDA), document objects corresponding to a definition of confidential information, names of parties involved, and a date on which the agreement takes effect, and an object requirement that the value of the document object corresponding to the definition of confidential information be at least 150 characters in length. This feature vector may be generated using a historical document model characterized by those features. This feature vector may be included in a set of feature vectors that form a training set. The recommendation engine 230 may create the training set by creating feature vectors for multiple historical document models (e.g., each having the agreement type of non-disclosure agreement). The recommendation engine 230 may label each of the feature vectors in the training set using a utility score that is user-specified (e.g., the recommendation engine 230 receives the label from a user) or determined automatically (e.g., based on statistics of how often certain permutations of document attributes reappear, where more frequent permutations are given a higher utility score based on their frequency of use). The recommendation engine 230 may then use the training set to train a machine-learned model to receive a feature vector and generate a corresponding utility score for the feature vector. The received feature vector may be a representation of the user-specified definition of the target document model. The recommendation engine 230 may generate the feature vector from the received definition and apply the machine-learned model to the generated feature vector.

Using the determined utility score, the recommendation engine 230 may determine that there is no recommendation to be made and proceed to generate the target document model. In some embodiments, the recommendation engine 230 may use the utility score to determine that a recommendation can be made to modify the target document model. For example, the machine-learned model allows the recommendation engine 230 to determine that the user's definition of an NDA model is different from a majority of similar, frequently used document models for NDAs. In turn, the recommendation engine 230 may compare the feature vector to a historical feature vector (e.g., of a document model that is frequently used) to determine the difference between feature vectors. For example, in response to determining that there is a document object or object requirement that is in the historical feature vector and not in the feature vector of the user's definition, the recommendation engine 230 may present the document object or the object requirement for display at a client device with a recommendation to add the document object or the object requirement to the target document model. In response to determining that the user has selected one of the presented document object or the object requirement, the document model editor 235 may edit the target document model to include the selection. In another example, in response to determining that there is a document object or object requirement that is in the feature vector of the user's definition and not in the historical feature vector, the recommendation engine 230 may present the document object or the object requirement for display at a client device with a recommendation to remove the document object or the object requirement from the target document model. In response to determining that the user has selected one of the presented document object or the object requirement, the document model editor 235 may edit the target document model to exclude the selection.

The recommendation engine 230 may determine a subset of a larger group of historical document models from which to identify a document attribute for recommending to a user. In some embodiments, the recommendation engine 230 may determine a similarity between a user's definition of a target document model and historical document models, where the similarity is used to filter the subset from the larger group of historical document models. The similarity may be a document attribute or any suitable parameter related to the content of the document model or operations involving an agreement document generated from the document model. The recommendation engine 230 may identify a characteristic of an organization to which the user specifying the target document model definition belongs, determine multiple organizations having that characteristic, and identify the historical agreement documents generated by those organizations that also have the same agreement type as the target document model. For example, the recommendation engine 230 may use an organization field (e.g., pharmaceutical) to filter historical agreement documents created by organizations in the pharmaceutical field that also have the same agreement type (e.g., sales contract) as the user creating the target document model.

In some embodiments, the recommendation engine 230 can determine a recommendation to modify a target document model based on a location of a signing entity. The recommendation engine 230 may determine a location of a signing entity and determine objects for which the document model editor 235 can include or exclude based on the determined location. The recommendation engine 230 may determine the signing entity's location based on an object value in the document model. For example, the recommendation engine 230 may use a document object corresponding to a user's residential address to determine the user's location. Alternatively or additionally, the recommendation engine 230 may determine the signing entity's location based on network parameters such as a user's Internet Protocol address (IP address).

The recommendation engine 230 may determine modifications for a document model based on the determined location. For example, the recommendation engine 230 may access a mapping of location-specific document objects or object requirements, where the mapping is stored by the document management system 110 or stored by a third party (e.g., a government agency). In another example, the recommendation engine 230 may determine, using a statistical model, a correlation between document objects and a signing entity's location or object requirements and a signing entity's location. The recommendation engine 230, after determining a document object or object requirement that is likely to be associated with a particular location of a signing entity, may then determine whether the document object or object requirement is present in the target document model. In response to determining that the document object or object requirement is not present, the recommendation engine 230 may provide the document object or object requirement as a recommendation to the user to add into the target document model.

The document model editor 235 edits a document model stored in the document model datastore 210. Additionally or alternatively, the document model editor 235 may create a document model and store the created document model in the datastore 210. In some embodiments, the document model editor 235 may create a document model using a definition of a document model that is specified by a user. In some embodiments, the document model editor 235 may store the agreement document file at the envelope datastore 215 (e.g., functioning as temporary storage) and delete the agreement document file from storage once the corresponding document model is created and stored in the document model datastore 210. By minimizing the number of agreement file document stored at the document management system 110, the document model editor 235 reduces the memory resources expended by the document management system 110. The document management system 110 may store a minimum number of agreement documents in the envelope datastore 215 for reference during comparisons of agreement documents or for faster delivery of an agreement document to a user than generating the document on demand.

In addition or as an alternative to receiving a user's definition of a document model to create the document model, the document model editor 235 can create a document model from an agreement document. The document model editor 235 receives an agreement document (e.g., an electronic copy of the document in portable document format (PDF) or any suitable file format for a text document). The agreement document includes data that is suitable to be values for a document model's objects. For example, a PDF of an employment contract includes data such as the employer's name, employee's name, salary, job title, and address of work. However, one of more of these values included in the agreement document may not be represented using corresponding metadata, rather the data is represented through text strings. That is, the values take the form of unstructured data within the file. In some instances, this unstructured data may also occupy more memory space than having data in a structured format (e.g., in a document model). For example, a PDF file includes fonts embedded within the file, the entirety of which a user may not need. The document model editor 235 can create a document model that can be used to generate the agreement of an agreement document file while occupying less memory space than the agreement document file.

The document model editor 235 may identify the received agreement document as corresponding to one of the documents stored in the envelope datastore 215. In some embodiments, the document model editor 235 may identify a corresponding document in the datastore 215 by comparing documents to determine whether a threshold amount of matching text has been met. For example, the document model editor 235 performs optical character recognition on the PDF file of an employment contract and compares the language to other documents in the envelope datastore 215. Agreement documents may often have similar standard language, rendering (e.g., font style, spacing, etc.), or other attribute that is the same across multiple agreement documents. The document model editor 235 may narrow down the documents in the datastore 215 used for comparison and thus, reduce the processing resources expended. For example, the document model editor 235 accesses, from the datastore 215, agreement documents from the same author or organization with which the PDF file is associated.

The document model editor 235 may identify, using the agreement documents that have a threshold amount of matching with the received agreement document, the unstructured values that could be structured into document objects and consequently, a document model. For example, the document model editor 235 may compare text strings to distinguish standard language from the customized language (e.g., details unique to a user of the agreement such as the user's name). The document model editor 235 may also compare the location of customized language among the standard language to determine a type of customized data. For example, a business's address may be located between standard text of "the Company located at" and a period. The document model editor 235 can then generate a data structure using the unstructured values. For example, the document model editor 235 may associate an address string in the employment contract with a document object for the business's address. The generated data structure may be included in a document model.

In some embodiments, the document model editor 235 modifies a document model to include an electronic signature provided by a signing entity. For example, the document model editor 235 receives an electronic signature represented as an image and stores the image in the document model as a value corresponding to a document object for the signing entity's signature. The document model editor 235 may, in response to storing an electronic signature in a document model, delete a copy of an executed agreement document file stored at the envelope datastore 215. The document model editor 235 may facilitate modifying a document model based on a recommendation determined by the recommendation engine 230. The document model editor 235 may receive a user's definition of a target document model and generate the target document model using the definition. After the recommendation engine 230 has provided a recommendation related to the target document model, the document model editor 235 can receive a user selection of a recommended document attribute (e.g., document object) to include or exclude from a target document model. The document model editor 235 can then modify the target document model accordingly.

The envelope editor 240 edits envelopes or agreement documents of an envelope. The envelope editor 240 may create envelopes or agreement documents. For convenience, the operations performed by the envelope editor 240 are described with reference to an agreement document, but the envelope editor 240 may perform similar operations with an envelope of one or more agreement documents. To edit or create an agreement document, the envelope editor 240 accesses a document model (e.g., from the document model datastore 210). The envelope editor 240 can modify an agreement document, which may be a template or existing agreement document. A template may include standard language and input fields for document objects and the document objects' corresponding values. A template may be used to create an agreement document. An existing agreement document may be a populated template. The templates may be stored in the envelope datastore 215. The envelope editor 240 may modify an agreement document such that the modified agreement document includes a set of document objects included in a document model, which is populated with values representative of a characteristic of the agreement document. The envelope editor 240 may store envelopes or documents at a storage (e.g., the envelope datastore 215) and determine when to delete the stored envelopes or documents to conserve memory space. In some embodiments, the envelope editor 240 may determine to delete an agreement document from the envelope datastore 215 after providing the agreement document to a client. For example, the envelope editor 240 may determine whether a client has accessed or signed the document, and delete the agreement document from storage after determining that a client has accessed or signed the document. In another example, the envelope editor 240 may determine to delete the provided agreement document after a predetermined time has expired. The deleted document may be recreated (e.g., as requested by a user) by the envelope editor 240 from the corresponding document model.

The interface 245 is an interface for a user and/or a third-party software platform to interact with the document management system 110. The interface 245 may be a web application that is run by a web browser at a user device or a software as a service platform that is accessible by the client device through network 120. The interface 245 may be the front-end component of a mobile application or a desktop application. In one embodiment, the interface 245 may use application program interfaces (APIs) to communicate with user devices or third-party platform servers, which may include mechanisms such as webhooks.

Figure 3:
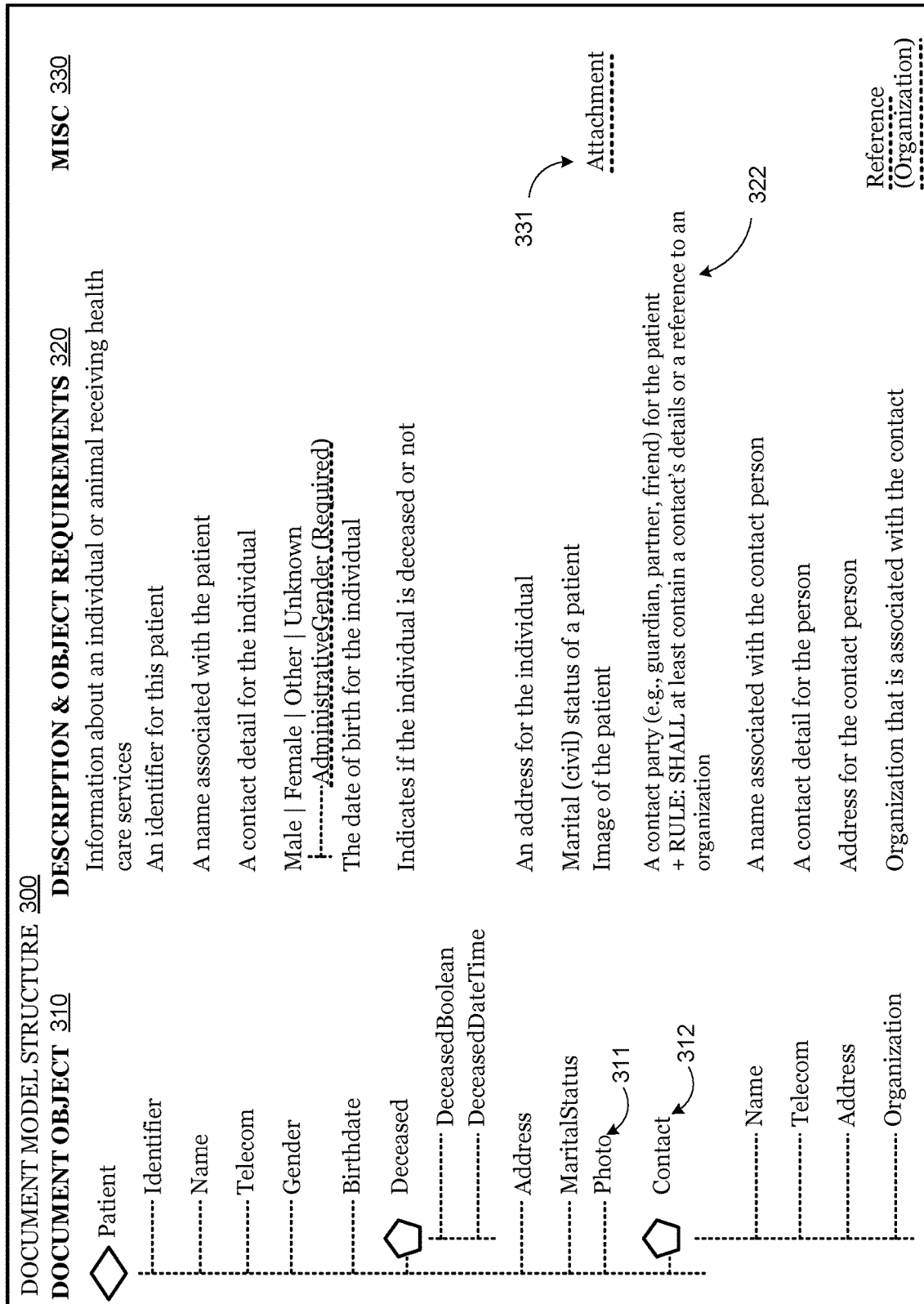
FIG. 3 shows a document model managed by the document management system of FIG. 1, in accordance with one embodiment.

FIG. 3 shows a document model 300 managed by the document management system 110, in accordance with one embodiment. The document model 300 may be a patient agreement form generated by the document management system 110 for a hospital domain. The document model 300 includes a hierarchical structure of document objects 310, including a document object 311 for a picture of the patient and a document object 312 for the patient's emergency contact. The document model 300 includes document objects 310 that are mapped to corresponding descriptions and object requirements 320, which include an object requirement 322 specifying a condition for the document object 312 that certain contact information must be included for an emergency contact. This condition may be required, for example, before the agreement can be signed by the patient or before the agreement may be provided to a third party health care service. The document model 300 also includes additional data 330 that are mapped to the document objects 310. For example, a link to an attachment 331 is mapped to the document object 311 for a user's photo. The document model 300 may be provided for display at a client device of a user (e.g., for editing or viewing). A user of the document management system 110 may click the link to view the attachment 331, which may be stored at the document management system 110 or a third party storage. Portions of the document model 300 are depicted in FIG. 3 using underlining to indicate that the user may select the text (e.g., using a cursor or touch screen) and in response, the document management system 110 provides additional data to the user (e.g., additional information about the document object description or object requirement, or a file such as an image of a patient).

Example Processes Using the Document Management System

Figure 4:
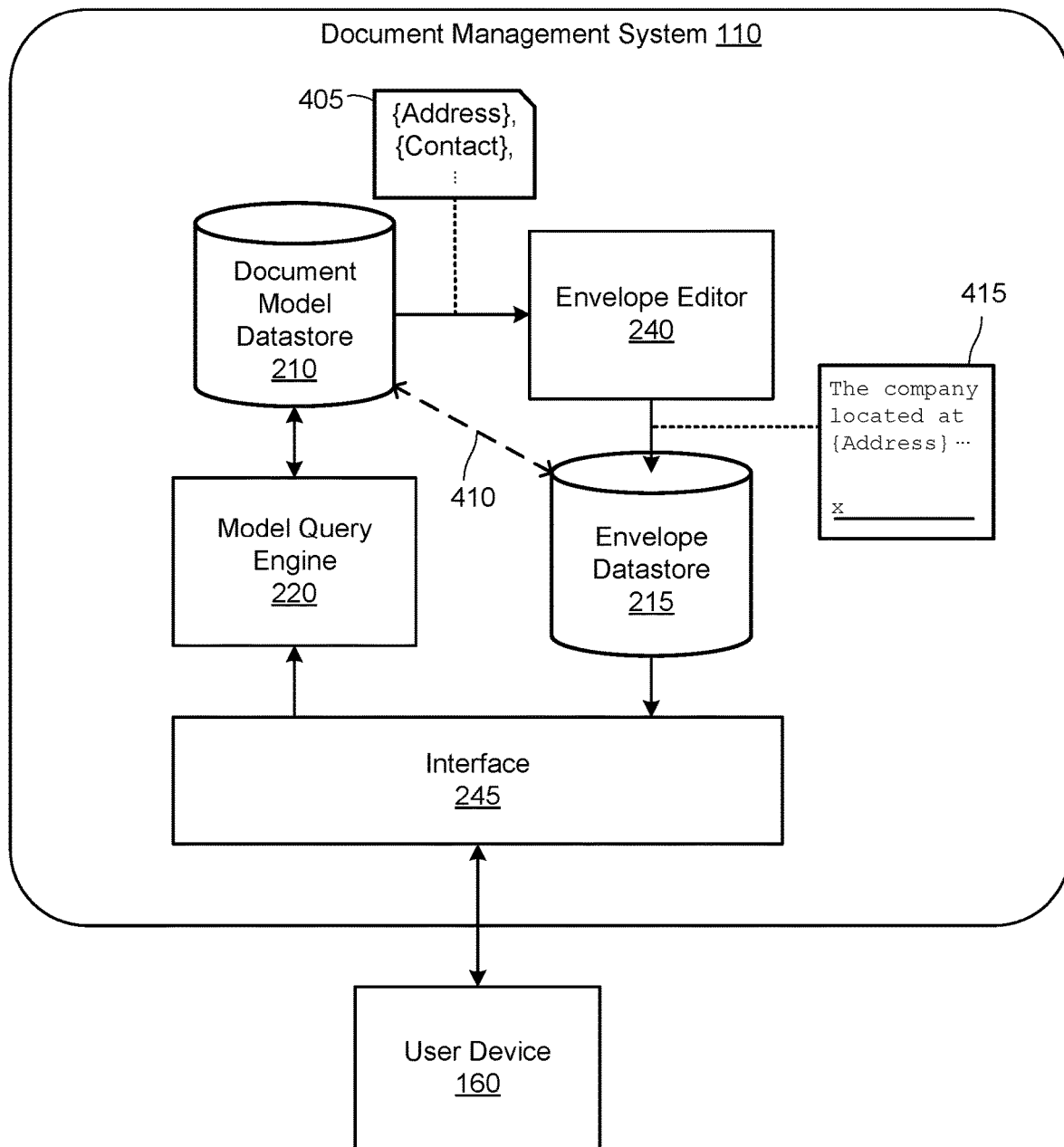
FIG. 4 depicts a block diagram of a process for fulfilling a user's query to provide an agreement document using a document model, in accordance with one embodiment.

FIG. 4 depicts a block diagram of a process 400 for fulfilling a user's query to provide an agreement document using a document model, in accordance with one embodiment. The envelope editor 240 may access a document model 405 that includes a set of document objects (e.g., an address and a contact) and corresponds to a particular agreement type (e.g., a patient agreement). The document objects can correspond to a characteristic of an agreement document. The envelope editor 240 can modify an agreement document of a set of agreement documents using the accessed document model 405. The modified agreement document 415 can include one of more of the set of document objects included in the accessed document model 405, and each document object can include a respective value representative of the characteristic of the agreement document. For example, the modified agreement document 415 is depicted as including an address document object of the document model 405. Either or both of the agreement document or the modified agreement document 415 may be stored in the envelope datastore 215. There is a relationship 410 between the accessed document model 405 and the agreement document stored in the datastore 215 indicative of the inclusion of the document model's objects and requirements in the agreement document.

Further in the process 400, the user device 160 interacts with the document management system 110 to query for an agreement document. The interface 245 receives a query from the user device 160 identifying an agreement document characteristic and an agreement document condition. The interface 245 forwards the query to the model query engine 220. The model query engine 220 queries the set of document objects in the document model datastore 210 to identify documents in a set of modified agreement documents, where the set of modified agreement documents match the user's query (e.g., they include document objects corresponding to the agreement document characteristic and/or include values that satisfy the agreement document condition) and include the modified agreement document 415. Due to the relationship 410 between the document models of the datastore 210 and agreement documents stored in the datastore 215, the model query engine 220 may identify matching agreement documents by identifying document objects and/or object requirements (e.g., in contrast to parsing through unstructured text of each agreement document, which may be more processing intensive). The model query engine 220, using the interface 245, may provide the identified documents to the user device 160 for display in conjunction with the agreement document characteristic and the agreement document condition.

Figure 5:
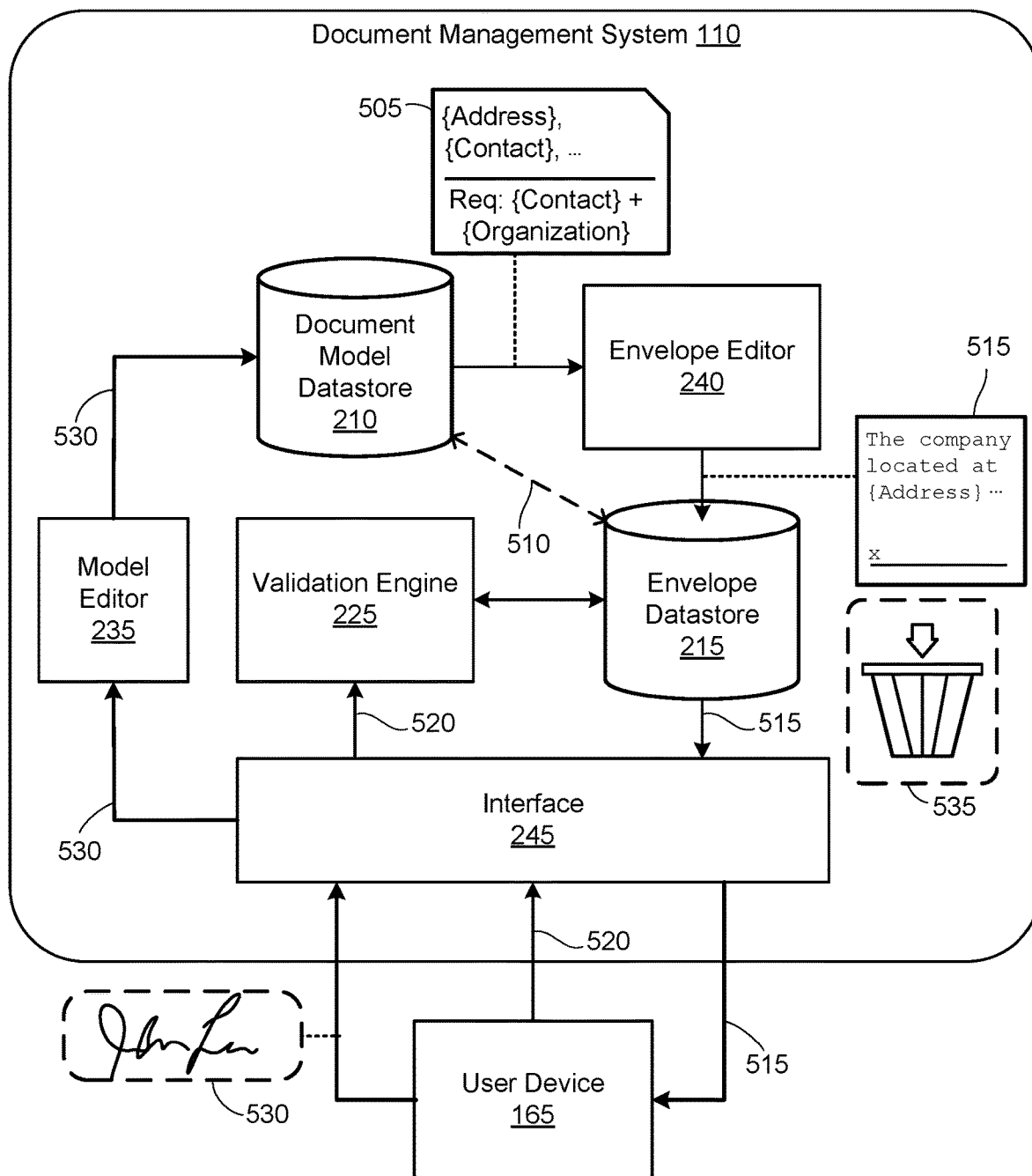
FIG. 5 depicts a block diagram of a process for validating an agreement document before execution, in accordance with one embodiment.

FIG. 5 depicts a block diagram of a process 500 for validating an agreement document before execution using the document management system 110, in accordance with one embodiment. The envelope editor 240 accesses a document model 505 that includes a set of document objects (e.g., an address and a contact) and a set of object requirements (e.g., the contact must have an associated organization to which the contact belongs). The document model 505 corresponds to an agreement type. The set of document objects each correspond to a characteristic of an agreement document. The set of object requirements each include a condition that must be satisfied by one or more document objects before the agreement document can be executed. The envelope editor 240 generates the agreement document 515 based on the document model 505. The agreement document 515 can be associated with one or more signing entities (e.g., the user of the user device 165). The agreement document 515 can include a value for each of one or more of the set of document objects. The envelope editor 240 may store the agreement document 515 in the envelope datastore 215. The agreement documents stored in the datastore 215 may have a relationship 510 with document models stored in the 210, as each agreement document is related to a document model that was used to generate the document.

The interface 245 can receive a request 520 to electronically sign the agreement document 515 from a signing entity (e.g., from the user device 165). The interface 245 forwards the request to the validation engine 225, which then determines whether the agreement document 515 is validated for execution. The validation engine 225 determines whether the values included in the document objects associated with the set of object requirements indeed satisfy the set of object requirements. In response to determining that the values do indeed satisfy the set of object requirements, the validation engine 225 provides that agreement document 515 to the signing entity (e.g., via the interface 245) within a signing interface configured to enable the signing entity to electronically sign the agreement document 515. However, in response to determining that the values do not satisfy the set of object requirements, the validation engine 225 denies the request 520 to electronically sign the agreement document. Additionally or alternatively, the validation engine 225 can identify to the signing entity the object requirements that were not satisfied.

The envelope editor 240 can store the agreement document 515 at the envelope datastore 215. In response to determining that the signing entity has provided an electronic signature 530 on a validated agreement document 515 that satisfies the document model's object requirements and after modifying the document model 505 to include the electronic signature 530 (e.g., an image of the signature), the envelope editor 240 can delete 535 the locally stored copy of the agreement document. This may increase available memory resources at the document management system 110.

Figure 6:
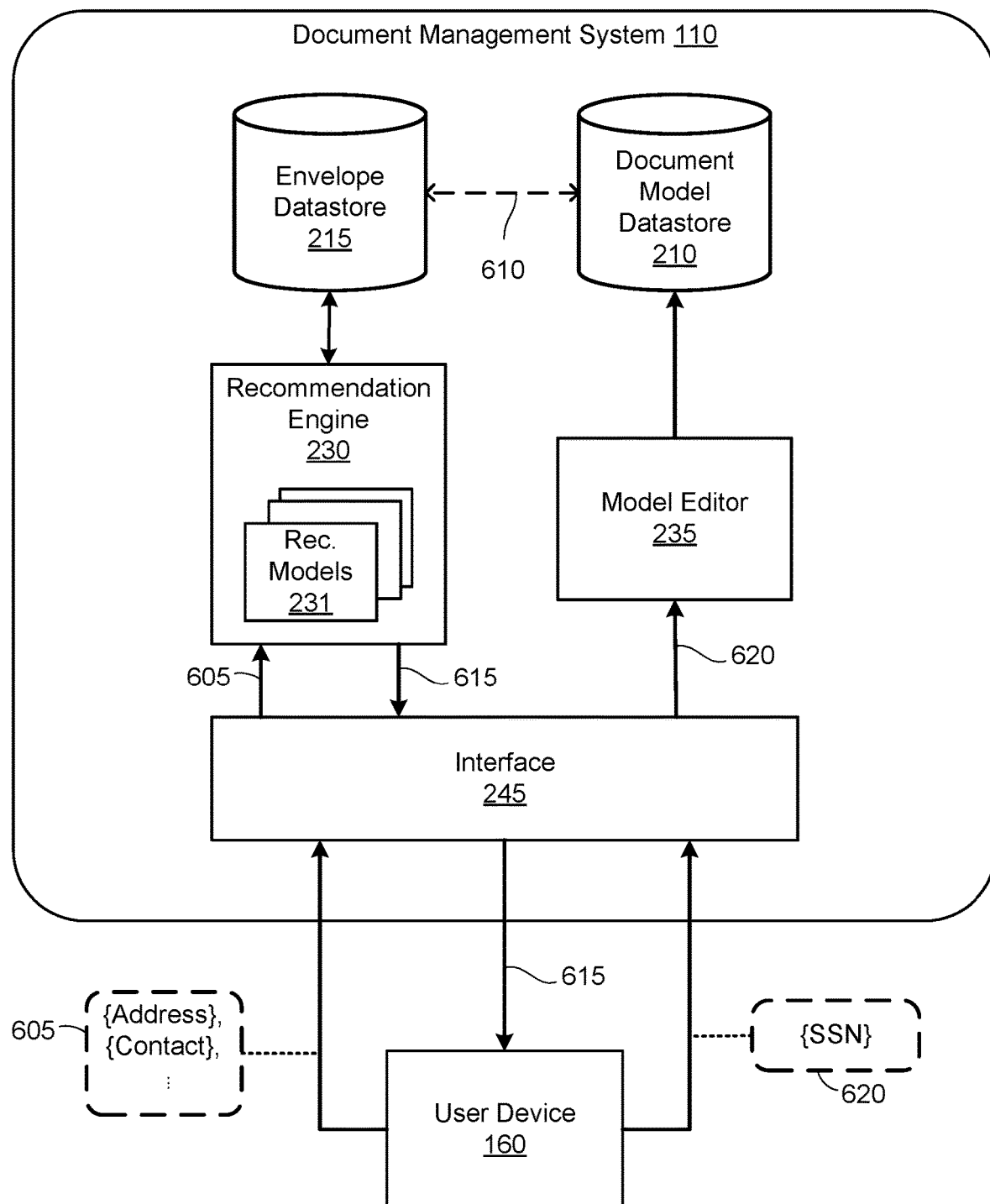
FIG. 6 depicts a block diagram of a process for modifying a document model based on a recommendation determined by the document management system described herein, in accordance with one embodiment.

FIG. 6 depicts a block diagram of a process 600 for modifying a document model based on a recommendation determined by the document management system 110, in accordance with one embodiment. The interface 245 receives a definition 605 of a target document model corresponding to a type of agreement document. The definition can be received from a user (e.g., via the user device 160). The interface 245 forwards the definition 605 to the recommendation engine 230. The target document model can include a set of target document objects (e.g., an address and a contact), where the set of target documents each correspond to a characteristic of an agreement document. The recommendation engine 230 can access, from the envelope datastore 215, a set of historical agreement documents corresponding to the type of agreement document. Each historical agreement document can be related 610 to a corresponding historical document model (e.g., stored in the document model datastore 210). The recommendation engine 230 can identify one or more document objects 615 within the historical document models that are not included in the target document model. The recommendation engine 230 can present the identified one or more document objects 615 to the user. The interface 245 can receive a user selection of a presented document object 620 (e.g., a social security number document object) and in turn, the model editor 235 can modify the target document model to include the selected document object 620. The model editor 235 can store the modified target model in the document model datastore 210.

FIG. 7 is a flowchart illustrating a process 700 for fulfilling a user's query to provide an agreement document using a document model, in accordance with one embodiment. The document management system 110 may perform the process 700. In some embodiments, the document management system 110 performs operations of the process 700 in parallel or in different orders, or may perform different operations.

The document management system 110 accesses 702 a document model including a set of document objects. The document model can correspond to an agreement type. The set of document objects may each correspond to a characteristic of an agreement document. For example, a vendor contract agreement document of a type "contract" can be generated using a corresponding document model. The vendor contract agreement may be characterized by a characteristic such as the parties involved. This characteristic may correspond to document objects of the document model, where the document objects can include a client name and a vendor name. Another characteristic may include consideration, corresponding to a consideration document object.

The document management system 110 modifies 704 an agreement document of a set of agreement documents using the document model. The modified agreement document may include one or more of the set of document objects including a value representative of the characteristic of the agreement document. Following the previous example, the vendor contract is modified to include the names of businesses "Trampoline Inc." and "Gymnastics World" for the vendor and client, respectively. The vendor contract may be modified to include consideration specifying the cost of a trampoline and the trampoline itself.

The document management system 110 receives 706 a query identifying an agreement document characteristic and an agreement document condition. Following the previous example, a user may search for vendor contracts involving the characteristic of parties involved and an agreement document condition requiring consideration in the vendor contract. In this example, the user may be querying for valid contracts between Trampoline Inc. and Gymnastics World.

The document management system 110 queries 708 the set of document objects to identify documents in a set of modified agreement documents, which can include the modified agreement document. The set of modified agreement documents may include document objects corresponding to the agreement document characteristic and include values that satisfy the agreement document condition. Following the previous example, multiple agreement documents generated using document models are queried to determine whether the agreement documents include the parties Trampoline Inc. and Gymnastics World in addition to having consideration.

The document management system 110 provides 710 the identified documents to a client device for display in conjunction with the agreement document characteristic and the agreement document condition. Following the previous example, the document management system 110 displays two vendor contracts between Trampoline Inc. and Gymnastics World stating that trampolines would be provided for a certain monetary value. While the two contracts are displayed (e.g., on a user device), the document management system 110 also displays the query parameters of the characteristic, the two parties' names, and object requirement, the consideration requirement.

Figure 8:
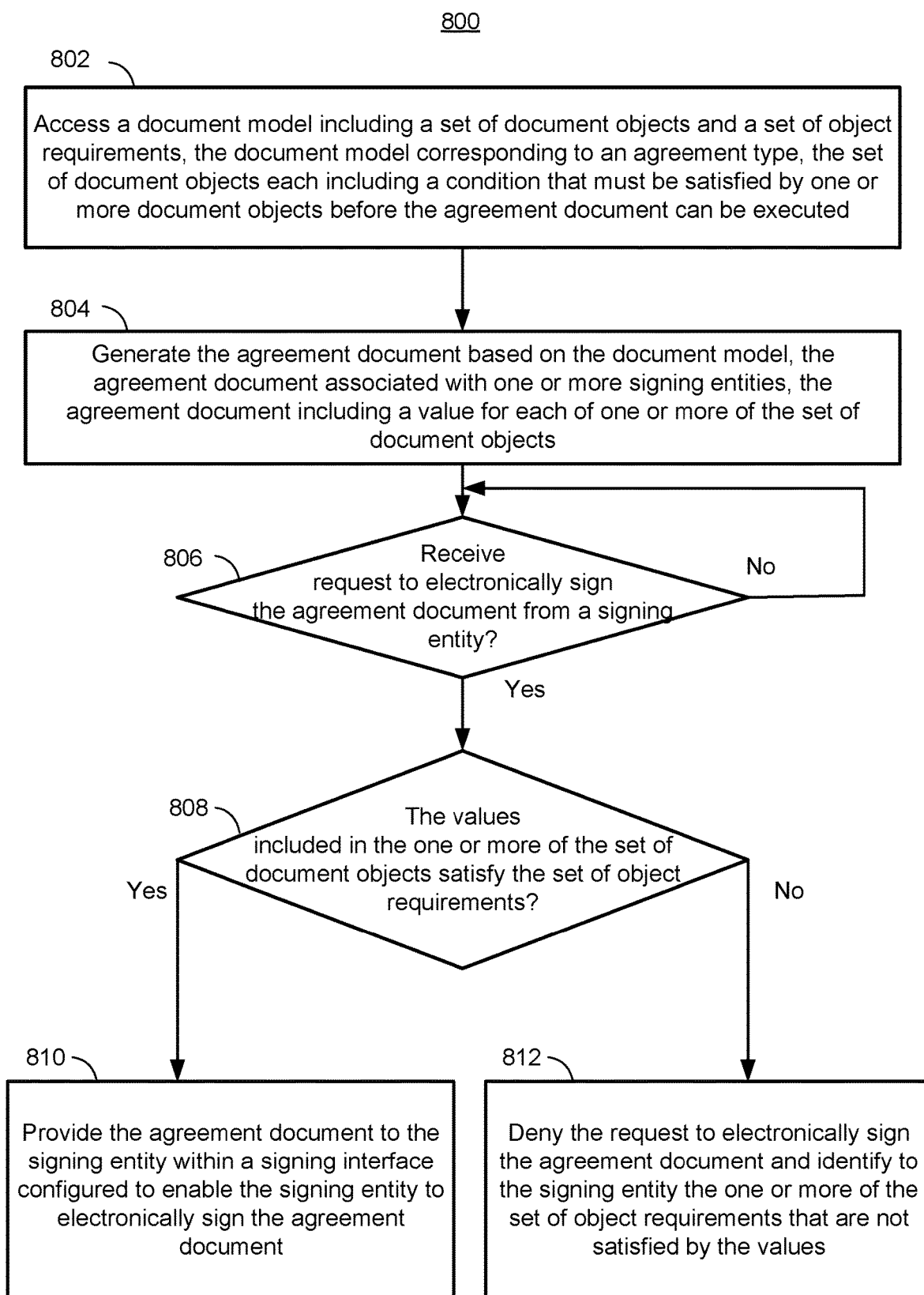
FIG. 8 is a flowchart illustrating a process for validating an agreement document before execution using the document management system described herein, in accordance with one embodiment.

FIG. 8 is a flowchart illustrating a process 800 for validating an agreement document before execution using the document management system 110, in accordance with one embodiment. The document management system 110 may perform the process 800. In some embodiments, the document management system 110 performs operations of the process 800 in parallel or in different orders, or may perform different operations.

The document management system 110 accesses 802 a document model including a set of document objects and a set of object requirements. The document model may correspond to an agreement type. The set of document objects can each include a condition that must be satisfied by one or more document objects before the agreement document can be executed. For example, a vendor contract agreement document of a type "contract" can be generated using a corresponding document model. The vendor contract agreement may be characterized by a characteristic such as the parties involved. This characteristic may correspond to document objects of the document model, where the document objects can include a client name and a vendor name. Another characteristic may include consideration, corresponding to a consideration document object. The document model may include an object requirement such as the consideration document object cannot be a null value (i.e., consideration must be present for a valid contract).

The document management system 110 generates 804 the agreement document based on the document model. The agreement document can be associated with one or more signing entities. The agreement document may include a value for each of one or more of the set of document objects. Following the previous example, the vendor contract is generated with the names of businesses "Trampoline Inc." and "Gymnastics World" for the vendor and client, respectively. The names are the values of document objects corresponding to parties involved in the agreement. The document model can include document objects corresponding to signature fields for the vendor and client, where the signature field document objects can be linked to the document objects for the parties involved. In at least this way, the vendor contract can be associated with one or more signing entities (e.g., the vendor and the client).

The document management system 110 determines 806 whether a request to electronically sign the agreement document from a signing entity was received. Following the previous example, a user device of a representative of Trampoline Inc. or Gymnastics World may transmit a request to the document management system 110 to provide an electronic signature at a signature field of the vendor contract. If the request is not received, the process 800 may return to determining 806 whether the request was received, waiting for the request before proceeding with other operations in the process 800. If the request is received, the process 800 may proceed to another operation in the process 800.

The document management system 110 determines 808 whether the values included in the one or more of the set of document objects satisfy the set of object requirements. Following the previous example, a monetary value to be provided to Trampoline Inc. by Gymnastics World for trampolines provided by Trampoline Inc. to Gymnastics World may a value specified in the consideration document object of the vendor contract's document model. The document management system 110 determines whether that value is present in the document model. For example, if a representative from Gymnastics World or Trampoline Inc. using the document management system 110 to modify or create the vendor contract leaves the value of the consideration document object empty (e.g., a null value), the document management system 110 determines that the object requirement of having a non-null value present in the consideration document object is not satisfied. Alternatively, if the representative does provide a value for the consideration document object (e.g., one thousand dollars for one trampoline), the document management system 110 determines that the object requirement of having a non-null value present is satisfied.

In response to determining 808 that the values do satisfy the set of object requirements, the document management system 110 provides 810 the agreement document to the signing entity within a signing interface configured to enable the signing entity to electronically sign the agreement document. Following the previous example, the document management system 110 determines consideration is present in the vendor contract because the value of the consideration document object is non-null and subsequently, allows the signing entity to electronically sign the agreement document. The document management system 110 may prompt the signing entity to select a version of their electronic signature in response to the signing entity selecting the electronic signature field via touchscreen and determining that the object requirement related to the consideration document object is satisfied. In response to determining 808 that the values do not satisfy the set of object requirements, the document management system 110 denies 812 the request to electronically sign the agreement document and identify to the signing entity the one or more of the set of object requirements that are not satisfied by the values. For example, in response to determining that the consideration document object in the vendor contract between Trampoline Inc. and Gymnastics World is null, the document management system 110 deactivates responses from a user selecting the electronic signature field in the vendor contract. The document management system 110 may deny the signing entity from electronically signing the vendor contract by preventing display of a menu of versions of the signing entity's electronic signatures in response to the signing entity selecting the electronic signature field via touchscreen and determining that the object requirement related to the consideration document object is not satisfied.

Figure 9:
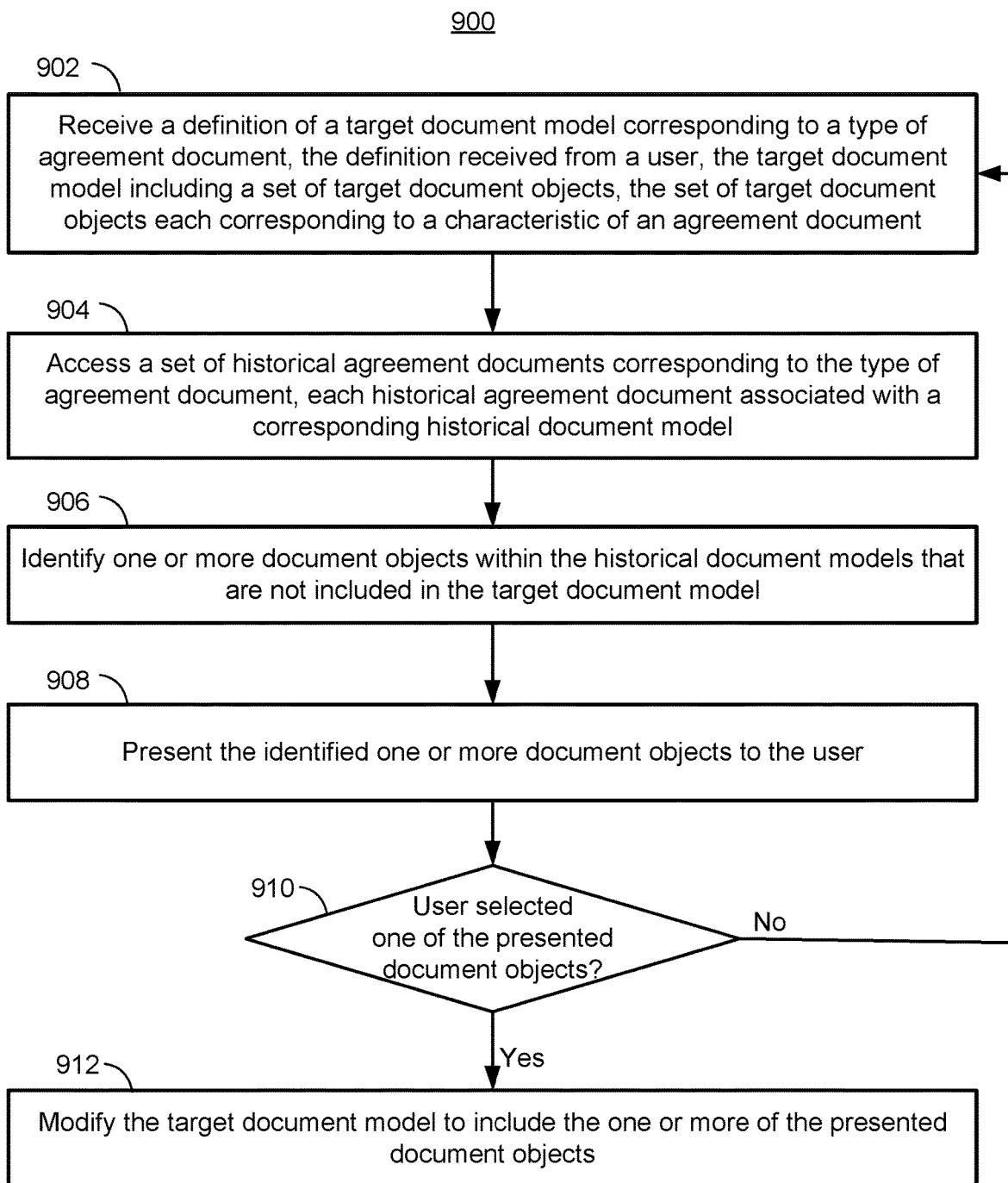
FIG. 9 is a flowchart illustrating a process for modifying a document model based on a recommendation determined by the document management system described herein, in accordance with one embodiment.

FIG. 9 is a flowchart illustrating a process 900 for modifying a document model based on a recommendation determined by the document management system 110, in accordance with one embodiment. The document management system 110 may perform the process 900. In some embodiments, the document management system 110 performs operations of the process 900 in parallel or in different orders, or may perform different operations.

The document management system 110 receives 902 a definition of a target document model corresponding to a type of agreement document. The definition can be received from a user. The target document model may include a set of target document objects. The set of target document objects can each correspond to a characteristic of an agreement document. For example, a vendor contract is an agreement document of a type "contract" that can be generated using a corresponding document model. A representative of a vendor, Trampoline Inc., may use a user device to specify a definition of a target document model that is used to generate the vendor contract. The vendor contract may be characterized by a characteristic such as the parties involved. This characteristic may correspond to document objects of the document model, where the document objects can include a client name and a vendor name. Another characteristic may include consideration, corresponding to a consideration document object. The document model may include an object requirement such as the consideration document object cannot be a null value (i.e., consideration must be present for a valid contract). The definition may include instructions for the document management system 110 to create the target document model having the document objects of consideration and agreement parties and having the object requirement of a non-null consideration value.

The document management system 110 accesses 904 a set of historical agreement documents corresponding to the type of agreement document. Each historical agreement document can be associated with a corresponding historical document model. Following the previous example, the document management system 110 stores various vendor contracts in local memory (e.g., the envelope datastore 215) and the respective document models used to generate them (e.g., stored in the document model datastore 210). These stored agreement documents can be queried via document attributes of their corresponding document models. For example, the document management system 110 accesses 904 a filtered set of historical agreement documents by querying the document model datastore 210 for an agreement type of "contract" and party name document object of "Trampoline Inc." The document model datastore 210 may return document models corresponding to vendor contracts that involved Trampoline Inc. as the vendor. The accessed 904 set of historical agreement documents includes the vendor contracts associated with the returned document models.

The document management system 110 identifies 906 one or more document objects within the historical document models that are not included in the target document model. Following the previous example, the document management system 110 identifies 906 that document objects for the installation and maintenance dates of the trampolines provided from Trampoline Inc. to Gymnastic World are absent from the target document model's definition. The document management system 110 may use a statistical model to identify that these document objects are missing from the target document model. For example, the document management system 110 generates and updates a histogram of document objects in vendor contracts involving Trampoline Inc. as the vendor. The document management system 110 determines a set of document objects that are included in historical document models at least a threshold number of times (e.g., using a threshold bin size). The document management system 110 may identify maintenance and installation date document objects as two of the document objects whose bins in the histogram meet a threshold bin size. The document management system 110 may then determine if one or more of the maintenance date or installation date document objects are not present in the target document model's definition.

Additionally, although not shown in the process 900, the document management system 110 can identify object requirements within the historical document models that are not included in the target document model. For example, the document management system 110 determines that an object requirement, which includes a condition that an address of a party must be present if the party's name is present in the document model, is missing from the target document model's definition. The document management system 110 may apply a machine-learned model to determine a utility score for the target document model, where the machine-learned model (e.g., of the recommendation models 231) is trained, using historical document models, to determine a utility score based on a feature vector representing the target document model. The document management system 110 generates the feature vector using features corresponding to the document objects and object requirements specified by the definition of the target document model. The document management system 110 applies the machine-learned model to the generated feature vector, and determines a utility score warranting a recommendation (e.g., the score is below a threshold set by a user). The document management system 110 then determines a recommendation, which includes identifying differences between historical document models and the target document model. One of the differences is that the target document model is missing an object requirement with a condition that the addresses of the parties involved must be present in the target document model if the parties involved are present in the target document model.

The document management system 110 presents 908 the identified one or more document objects to the user. Following the previous example involving missing document objects, the document management system 110 generates and provides a notification to a user device of a representative of Trampoline Inc. with a recommendation to modify the target document model to include installation and maintenance date document objects. Following the example involving a missing object requirement, the document management system 110 generates and provides a notification to the user device of the representative of Trampoline Inc. recommending that the modification to the target document model be made to include this missing object requirement requiring party addresses if party names are included in the target document model.

The document management system 110 determines 910 whether the user has selected one of the presented document objects. In response to determining that the user has not selected any, the process 900 returns to receiving 902 another definition of a target document model. In response to determining that the user has selected a presented document object, the process 900 proceeds to modifying 912 the target document model to include the one or more of the presented document objects. Following the previous examples, the document management system 110 can add one or more of the missing installation date document object, maintenance date document object, or party address object requirement to the target document model of a vendor contract that the representative of Trampoline Inc. is using the document management system 110 to create.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for operating a data management system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving, by one or more processors, a definition of a target document model corresponding to a type of agreement document, the definition associated with a user, the target document model comprising a set of target document objects, the set of target document objects each corresponding to a characteristic of an agreement document;
   identifying, by the one or more processors and from a database of historical agreement documents, a set of historical agreement documents based on a characteristic of an organization to which the user belongs and the type of agreement document, each historical agreement document of the set of historical agreement documents associated with a corresponding historical document model;
   identifying, by the one or more processors, one or more document objects included within at least one of the historical document models and not included in the target document model; and
   modifying, by the one or more processors, the target document model that comprises the set of target document objects to further include the one or more document objects included within at least one of the historical document models and not included in the target document model.

2. The method of claim 1, wherein identifying the one or more document objects within the historical document models and not included in the target document model comprises:
   accessing a statistical model of document objects included within the historical document models; and
   filtering a set of document objects from document objects included within the historical document models using the statistical model,
   wherein the one or more document objects are included in the filtered set of document objects and not included in the target document model.

3. The method of claim 2, further comprising generating, by the one or more processors, the statistical model of document objects.

4. The method of claim 3, wherein generating the statistical model of document objects comprises determining a correlation between the document objects included within the historical document models and the type of agreement document.

5. The method of claim 2, wherein the statistical model comprises a histogram of the document objects included within the historical document models, and wherein filtering the set of document objects comprises determining histogram bins meeting a threshold object count.

6. The method of claim 1, wherein the historical document models further comprise respective historical object requirements, a given object requirement comprising a condition that must be satisfied by a given document object, further comprising:
   determining, by the one or more processors, one or more historical object requirements within the historical document models for inclusion within the target document model.

7. The method of claim 6, wherein the target document model further comprises a set of target object requirements, and wherein determining the one or more historical object requirements comprises:
   identifying that the one or more historical object requirements are included in the historical document models and not included in the target document model.

8. The method of claim 6, wherein determining the one or more object requirements comprises:
   applying a machine-learned model to the set of target document objects, the machine-learned model configured to determine a score representative of a similarity between the target document model and the historical document models; and
   in response to determining that the score does not meet a threshold score, determining a historical object requirement that is not included within target object requirements of the target document model.

9. The method of claim 8, further comprising training the machine-learned model using the historical document models and the historical object requirements satisfied by one or more historical document objects.

10. The method of claim 1, further comprising:
    identifying, by the one or more processors, a target document object of the set of target document objects that is not included in the historical document models; and
    presenting, by the one or more processors, the target document object to the user.

11. The method of claim 10, further comprising:
    in response to the user selecting the presented target document object, modifying, by the one or more processors, the target document model to exclude the selected target document object.

12. The method of claim 1, wherein identifying the set of historical agreement documents comprises:

identifying the characteristic of the organization to which the user belongs;

determining a plurality of organizations having the characteristic of the organization to which the user belongs; and identifying a plurality of historical agreement documents generated by the plurality of organizations and corresponding to the type of agreement document.

13. The method of claim 1, further comprising:

receiving, by the one or more processors, a request from a signing entity to electronically sign the agreement document;

determining, by the one or more processors, a location of the signing entity;

modifying, by the one or more processors, the target document model based on the location of the signing entity; and generating, by the one or more processors, the agreement document based on the modified target document model.

14. Non-transitory computer-readable storage media storing executable instructions that, when executed by one or more processors, cause the one or more processors to:

receive a definition of a target document model corresponding to a type of agreement document, the definition associated with a user, the target document model comprising a set of target document objects, the set of target document objects each corresponding to a characteristic of an agreement document;

identify, from a database of historical agreements documents, a set of historical agreement documents based on a characteristic of an organization to which the user belongs and the type of agreement document, each historical agreement document of the set of historical agreement documents associated with a corresponding historical document model;

identify one or more document objects included within at least one of the historical document models and not included in the target document model; and modify the target document model that comprises the set of target document objects to further include the one or more document objects included within at least one of the historical document models and not included in the target document model and not included in the target document model.

15. The non-transitory computer-readable storage media of claim 14, wherein the instructions to identify the one or more document objects within the historical document models and not included in the target document model cause the one or more processors to:

access a statistical model of document objects included within the historical document models; and filter a set of document objects from document objects included within the historical document models using the statistical model, wherein the one or more document objects are included in the filtered set of document objects and not included in the target document model.

16. The non-transitory computer-readable storage media of claim 15, wherein the instructions further cause the one or more processors to generate the statistical model of document objects, wherein the instructions to generate the statistical model of document objects cause the one or more processors to determine a correlation between the document objects included within the historical document models and the type of agreement document.

17. The non-transitory computer-readable storage media of claim 14, wherein the historical document models further comprise respective historical object requirements, the target document model further comprises a set of target object requirements, and a given object requirement comprises a condition that must be satisfied by a given document object, wherein the instructions further cause the one or more processors to:

determine one or more object requirements within the historical document models for inclusion within the target document model, wherein to determine the one or more object requirements, the instructions cause the one or more processors to:

apply a machine-learned model to the set of target document objects, the machine-learned model configured to determine a score representative of a similarity between the target document model and the historical document models; and in response to a determination that the score does not meet a threshold score, determine a historical object requirement that is not included within target object requirements of the target document model.

18. A system comprising one or more processors and non-transitory computer-readable storage media storing instructions that, when executed by the one or more processors, cause the one or more processors to:

receive a definition of a target document model corresponding to a type of agreement document, the definition associated with a user, the target document model comprising a set of target document objects, the set of target document objects each corresponding to a characteristic of an agreement document;

identify, from a database of historical agreement documents, a set of historical agreement documents based on a characteristic of an organization to which the user belongs and the type of agreement document, each historical agreement document of the set of historical agreement documents associated with a corresponding historical document model;

identify one or more document objects included within at least one of the historical document models and not included in the target document model; and modify the target document model that comprises the set of target document objects to further include the one or more document objects included within at least one of the historical document models and not included in the target document model.

19. The system of claim 18, wherein the instructions to identify the one or more document objects within the historical document models and not included in the target document model cause the one or more processors to:

access a statistical model of document objects included within the historical document models; and filter a set of document objects from document objects included within the historical document models using the statistical model, wherein the one or more document objects are included in the filtered set of document objects and not included in the target document model.

20. The system of claim 19, wherein the instructions further cause the one or more processors to generate the statistical model of document objects, wherein the instructions to generate the statistical model of document objects cause the one or more processors to determine a correlation between the document objects included within the historical document models and the type of agreement document.

\* \* \* \* \*